United States Patent

Allen et al.

[15] 3,640,137

[45] Feb. 8, 1972

[54] ERECTION CUTOFF SYSTEM FOR PLURAL GYROSCOPES

[72] Inventors: Terry S. Allen; Lynn R. Lane, both of Phoenix; Harold Lee Swartz, Glendale, all of Ariz.

[73] Assignee: Sperry Rand Corporation

[22] Filed: June 24, 1969

[21] Appl. No.: 836,027

[52] U.S. Cl. ....................74/5.34, 73/1 D, 74/5.41

[51] Int. Cl. ....................G01c 19/54

[58] Field of Search ....................74/5.34, 5.4, 5.41, 5.47; 73/1 D, 504; 244/79

[56] References Cited

UNITED STATES PATENTS 2,949,786 8/1960 Shaw, Jr. et al....................74/5.41
2,995,040 8/1961 Hammon....................74/5.47
3,276,269 10/1966 Whitehead....................74/5.41 X
3,401,549 9/1968 Miller....................73/1
3,456,513 7/1969 Emerson....................74/5.34 X
3,466,935 9/1969 Lanni....................74/5.41

*Primary Examiner*—Manuel A. Antonakas
*Attorney*—Samuel C. Yeaton

[57] ABSTRACT

A system for ensuring that the long term erection sensors of a plurality of gyroscopes installed in the same aircraft and providing substantially identical attitude reference information are cut off simultaneously to thereby reduce discrepancies in the information supplied by each of the gyroscopes due to tolerances in the cutoff thresholds of the long term reference sensors of each gyroscope.

6 Claims, 3 Drawing Figures

INVENTORS
TERRY S. ALLEN
LYNN R. LANE
HAROLD L. SWARTZ
BY H P Terry
ATTORNEY

INVENTORS
TERRY S. ALLEN
LYNN R. LANE
HAROLD L. SWARTZ
BY
H P Terry
ATTORNEY

ERECTION CUTOFF SYSTEM FOR PLURAL GYROSCOPES

BACKGROUND OF THE INVENTION

This invention is related to the field of gyroscopes and in particular to the long term slaving or erection control systems thereof. More specifically, the invention pertains to erection controls for a plurality of gyroscopes installed in an aircraft for providing the same or redundant attitude information.

In order to improve the reliability of aircraft flight indication and flight control systems primarily in large commercial, military and executive-type aircraft, it has become common practice to provide a plurality of gyroscopic references such as a plurality of vertical gyroscopes for controlling the pilot's and copilot's flight attitude indicators and/or single or redundant flight control systems. An example of such a multiple gyro system is disclosed in applicants' assignee's U.S. Pat. No. 3,401,549. In such installations it has been found that the information supplied by individual gyroscopes may not always be the same and the error may be substantial. This discrepancy in the information supplied by each of the gyroscopes has a serious effect on the flight safety of the aircraft since the pilots rely heavily on their attitude reference indicators in controlling the aircraft, particularly under IFR conditions. Furthermore, under automatic control of high-speed aircraft by said gyroscopic references, small attitude errors can quickly lead to dangerous situations. During certain conditions of flight the pilot's and copilot's attitude indicators will not present an indication of the same attitude thereby resulting in considerable confusion as to which indicator is providing the correct information. In most cases the plural gyroscopes are cross coupled by comparison monitoring circuits, as illustrated in the above U.S. Pat. No. 3,401,549, for indicating suitable warning devices when the gyros do not track each other within predetermined limits. Excessive and unwarranted operation of the warning devices which monitors such discrepancies may cause aircraft pilots to lose confidence in their primary attitude displays. Furthermore, some gyros have been actually removed from an aircraft as faulty because of frequent warning indications during flight maneuvers when in fact the removed gyros upon test prove to be perfectly normal.

Such drawbacks of plural gyroscope installations has serious impact in terms of flight safety and maintenance costs.

While the present invention is primarily applicable in plural vertical gyro installations, it will be understood that the concept thereof is equally applicable to other types of gyroscopic devices such as directional gyroscopes and gyroscopic platforms embodying erection and/or slaving cutoff systems.

SUMMARY OF THE INVENTION

As is well known to those acquainted with gyroscopic devices, a displacement gyroscope, for example a vertical gyroscope, will in normal unaccelerated flight tend to drift away from its normal vertical position due to precessional forces produced by mass unbalance, bearing friction, and the like. Thus, some long term reference is employed to maintain the gyro spin axis vertical, such reference usually being the earth's gravity vertical. Pendulous devices, such as liquid level switches are often employed to sense the direction of the gravity vertical and are used to apply a slow precession force on the gyro to maintain its spin axis vertical. However, since the sensors are responsive to the acceleration of gravity, they will also inherently be responsive to lateral and longitudinal accelerations of the aircraft which occur during turns and/or changes in aircraft velocity. Thus, it is normal practice to provide means for cutting out the long term slaving control of the gravity sensors whenever these aircraft accelerations exceed predetermined threshold values. In a typical aircraft control gyroscope, the normal drift rate with erection off may be 12° an hour in a 1 g. field. The precession rate provided by the erection system, however, is on the order of 2° per minute or 120° per hour. Therefore, with erection on the gyro will be precessed to a total acceleration vector displaced from gravity 10 times faster than it will lose gravity alignment with erection cut off. Thus, it is common practice to provide erection cutoff means for reducing inaccuracies associated with aircraft accelerations.

Considering a dual or multiple gyro installation having comparator type monitors of the type shown in the above-mentioned U.S. Patent, and having a warning threshold of say 4°, comparator threshold tolerances may provide a warning with as little as 2.0° spread (4.0° nominal − 2.0° tolerance) or as much as 6.0° spread (4.0° nominal ± 2.0° tolerance) between vertical gyros due to acceleration errors. The exact threshold for a given aircraft gyroscope system is dependent on the accumulation of tolerances of all of the elements in that specific system. For example, changing one gyro in an aircraft for another can change the threshold characteristics. In most cases, gyro dynamic error spreads are typically on the order of 1.0° to 1.5°. Thus, in multiple gyro systems the comparator can provide warning in straight and level flight, or can require a spread of as much as 12° before warning if all tolerances add.

In aircraft installations involving a plurality of separate attitude reference systems with comparator monitoring and warning it has been found that large discrepancies can occur in the indicated attitude when the aircraft are flown such as to produce accelerations near the thresholds of the gyro erection cutoff sensors. These discrepancies occur because one or more of the gyros may be operating with erection on while other gyros may be operating with erection off. The gyros which have their erection controls on will, therefore, precess into error at a greater rate than those with their erection off and in a direction to produce a further spread in the thresholds of the cutoff sensors. Thus, in accordance with the teachings of the present invention, an erection cutoff system is provided which ensures that erection cutoff will occur simultaneously on all gyros thereby substantially eliminating discrepancies between the information signal outputs from the gyros while at the same time producing no decrease in vertical gyro accuracy or reliability and reducing a flight safety hazard.

The details of construction and operation of a preferred embodiment of the present invention is set forth in the following specification and accompanying drawings wherein.

The purpose of the improved system is to reduce differences among the output of a plurality of gyroscopes, for example and as illustrated herein, differences in pitch synchro outputs, particularly during changes in aircraft velocity which occurs during departure and approach operations of jet aircraft. During these periods, accelerations near the thresholds of the pitch erection cutoff system, for example 0.82 knots per second, are frequent. Slight differences, within accepted tolerances, in spin axis orientation and cutoff sensor alignment, produce conditions where one (or two) gyroscope(s) pitch erection on, and the remaining gyro(s) has pitch erection cutoff. During these periods, the pitch axis outputs can separate at rates of over 2° per minute.

In accordance with the teachings of the present invention, pitch erection cutoff functions are cross connected between all gyros with logic circuitry which ensures simultaneous pitch erection cutoffs of all gyros. Difference errors are reduced because all gyros respond equally to the imposed acceleration field. Furthermore, by this interconnected vertical gyro pitch erection cutoff arrangement, reliability of the gyro system is improved and a flight safety hazard is eliminated.

Figure 1:
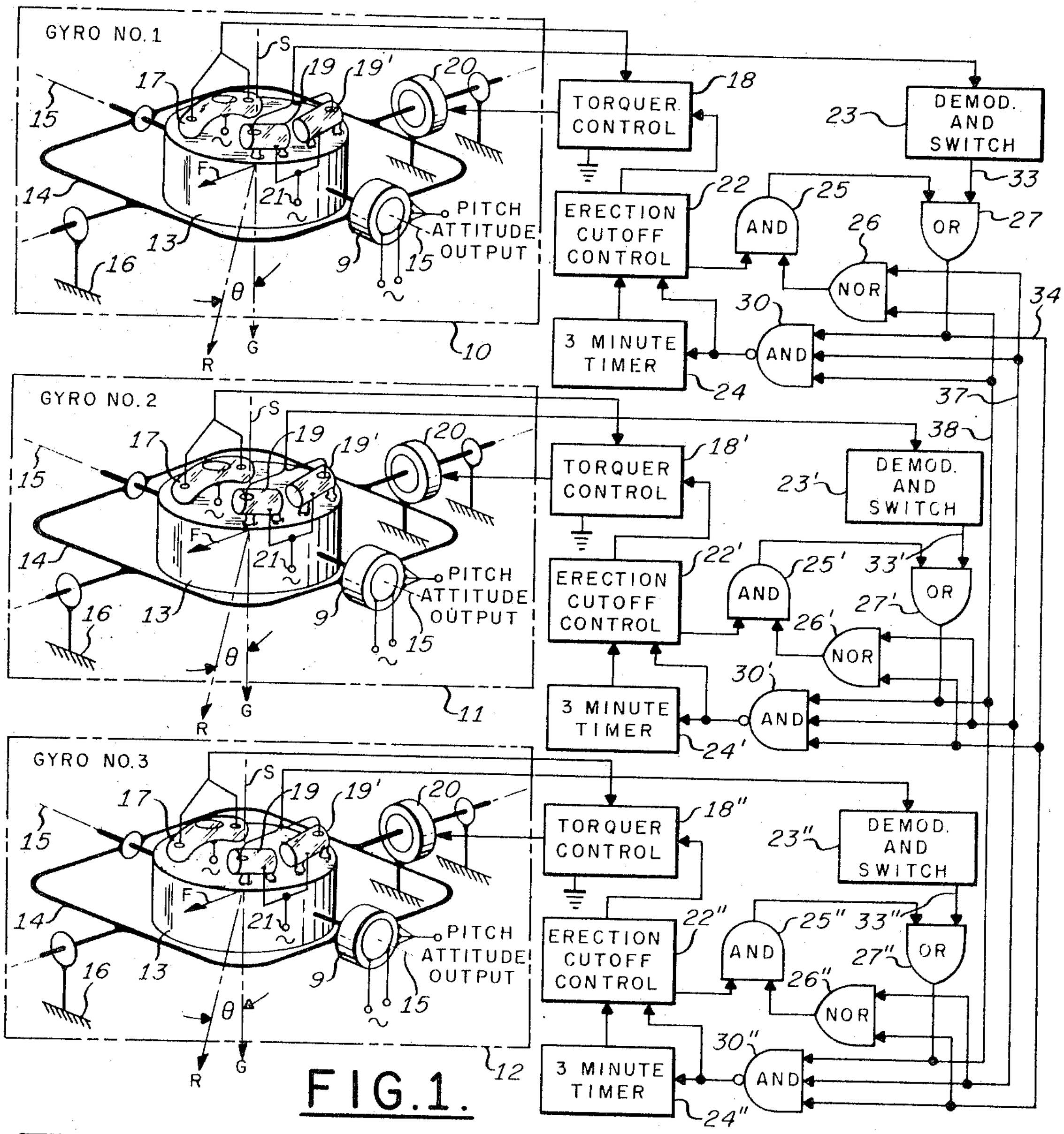
FIG. 1 is a schematic illustration of a system of three redundant vertical gyroscopes embodying the principles of the invention.

Referring now to FIG. 1, there is shown a block diagram of a plurality of vertical gyros installed in an aircraft, each having identical erection control and erection cutoff circuitry. Each gyro, 10, 11 and 12, may be of conventional construction and may be of the type shown in applicants' assignee's U.S. Pat. Nos. 2,945,381 and 2,720,116. Each gyro, only one of which is schematically illustrated in detail, comprises a rotor (not shown) supported in a rotor case 13 pivotally supported in a gimbal 14 with freedom of rotation about the pitch axis 15 of the aircraft, the gimbal 14 in turn being pivotally supported in gyro housing 16 for freedom of rotation about the craft roll axis. The housing 16 is fixed in the aircraft and moves with the aircraft. Aircraft pitch and roll data is provided by suitable pickoff means only the pitch pickoff, such as synchro 9, being illustrated. Each gyro has roll and pitch pendulous erection and erection cutoff controls of the electrolytic type and arranged generally in the manner taught in the above U.S. Pat. Nos. 2,945,381 only the pitch axis controls being illustrated herein for simplicity. The same principals apply to the roll and yaw axes.

As illustrated in this patent, the pitch pendulous sensor 17 detects tilt of the gyro and supplies erection control current to pitch torquer 20 through control circuit 18. Erection cutoff sensors 19 and 19′ comprise liquid levels mounted on rotor case 13 in oppositely tilted relation with respect to the horizontal whereby fore-aft acceleration of the aircraft will cause the electrolyte in one or the other of the liquid levels to conduct current and energize erection cutoff control circuitry 22 to interrupt the operation of the normal erection control circuit 18 as will be hereinafter more fully described.

Electrolyte within the pitch pendulous sensor (liquid level) 17 and erection cutoff sensors 19 and 19′ aligns with the apparent vertical force vector, R, which is the resultant of the gravitational force, G, and force vector, F, produced by fore-aft acceleration of the aircraft. Depending on the relationship between electrolyte and electrodes of liquid level 17, current is caused to flow through torquer control circuit 18 to energize the torquer 20 control field to produce a clockwise or counterclockwise torque on the outer gimbal that precesses the gyro spin axis to align with the apparent vertical R. If the aircraft is not accelerating, force vector F of course is zero, and the apparent vertical R is coincident with true vertical G.

The fluid to electrode relationship is described by the angle $\theta$, which is the angle between the apparent vertical R and the alignment axis of the pendulous sensor 17, or the erection cutoff sensors 19 and 19′. In the absence of the present invention, if $\theta$ exceeds the pitch erection cutoff sensor threshold, set for example at $2.5° \pm 0.25°$, a circuit between the 24 v. AC supply 21 and the erection cutoff control 22 is completed through demodulator 23 which serves to interrupt operation of the erection control 18 thereby opening the current path through the pitch torquer 20 freeing the gyro of its gravity controls. Thus, during normal flight when accelerations above the threshold are not present torquer control 18 is operative to erect the gyro to the vertical. However, when the pitch erection cutoff sensor 19 and 19′ conducts, as during a fore-aft acceleration, erection control 18 is inoperative and the gyro operates as a "free" gyro.

A timer 24 may be provided in the pitch cutoff circuit to restore normal pitch erection control if erection is removed for a predetermined period, say greater than 3.0 minutes. The 3 minute value is arrived at through the assumption that a modern transport aircraft does not accelerate for continuous periods greater than 3 minutes, and that any erection cutoff signal originating from the pitch erection cutoff sensor that exceeds 3 minutes is caused by the gyro spin axis being tilted from vertical. As a result, the timer may provide logic for distinguishing between true vertical errors and the errors induced by accelerations.

While only gyro 10 and its erection control and erection cutoff arrangement has been described in detail, it will be understood that gyros 11 and 12 together with their erection controls and erection cutoff circuits will be identical. This is illustrated in FIG. 1 by identifying corresponding elements of gyro 11 and gyro 12 with corresponding primed and double-primed reference characters, respectively.

In accordance with the teachings of the present invention, erection cutoff of all of the gyros occurs simultaneously thereby compensating for tolerances in the thresholds of the erection cutoff sensors of each gyro. In the embodiment of FIG. 1, this is accomplished by means of AND-circuits 30, 31 and 32 incorporated in the electronics of gyros 10, 11 and 12 respectively. The output 33 of demodulator 23 responsive to cutoff sensor 18–19 is applied to all AND-circuits 30, 31 and 32 through interconnect 34, and the outputs 35 and 36 of corresponding demodulators 23′ and 23″ of gyros 11 and 12 are similarly applied to all AND-circuits 30, 31 and 32 through leads 37 and 38 respectively. Thus, a demand for erection cutoff must be present in all connected gyros before erection cutoff will occur in any of the gyros. When all erection cutoff sensors trip, pitch erection cutoff is simultaneously removed from all gyros. Conversely, when the cutoff sensor of any one of the gyros 10, 11 or 12 ceases to conduct, normal pitch erection is simultaneously restored to all gyros.

As stated above, erection cutoff is not allowed to continue for more than a predetermined time interval, for example 3 minutes. Thus, when erection cutoff is initiated by the output of AND-logic 30 timer circuit 24 is started in all gyros. After 3 minutes have elapsed, timers 24 (or 24′ or 24″) will simultaneously reinstate erection on all of the gyros. This is done in such a manner that erection cutoff controls 22, 22′ and 22″ can distinguish between a timer reinstatement of erection and one produced by any of the sensors 9 or 19′ going to zero or a nonconducting state. This is accomplished by the logic schematic of FIG. 1. After 3 minutes, timer 24 (or 24′ or 24″) supplies a signal to erection control 22 which in turn allows torquer control 18 to energize torquer 20 from tilt detector 17. The timer signal is supplied to AND-logic 25 which also looks at the state (high or low) of the voltage on interconnect leads 37 and 38 of gyros 11 and 12. If timers 24′ or 24″ have triggered or are inoperative, NOR-logic 26 supplied an output to AND-logic 25 to thereby supply an output to OR-logic 27 which serves to drive the output of AND-logic 30 high and thus reset timer 24 (and 24′ and 24″) and restore erection. If either of leads 37 or 38 is high, the timer circuit of one of the gyros 11 or 12 has triggered and through its own similar logic reinstates its erection and at the same time that of the other gyros.

Figure 2:
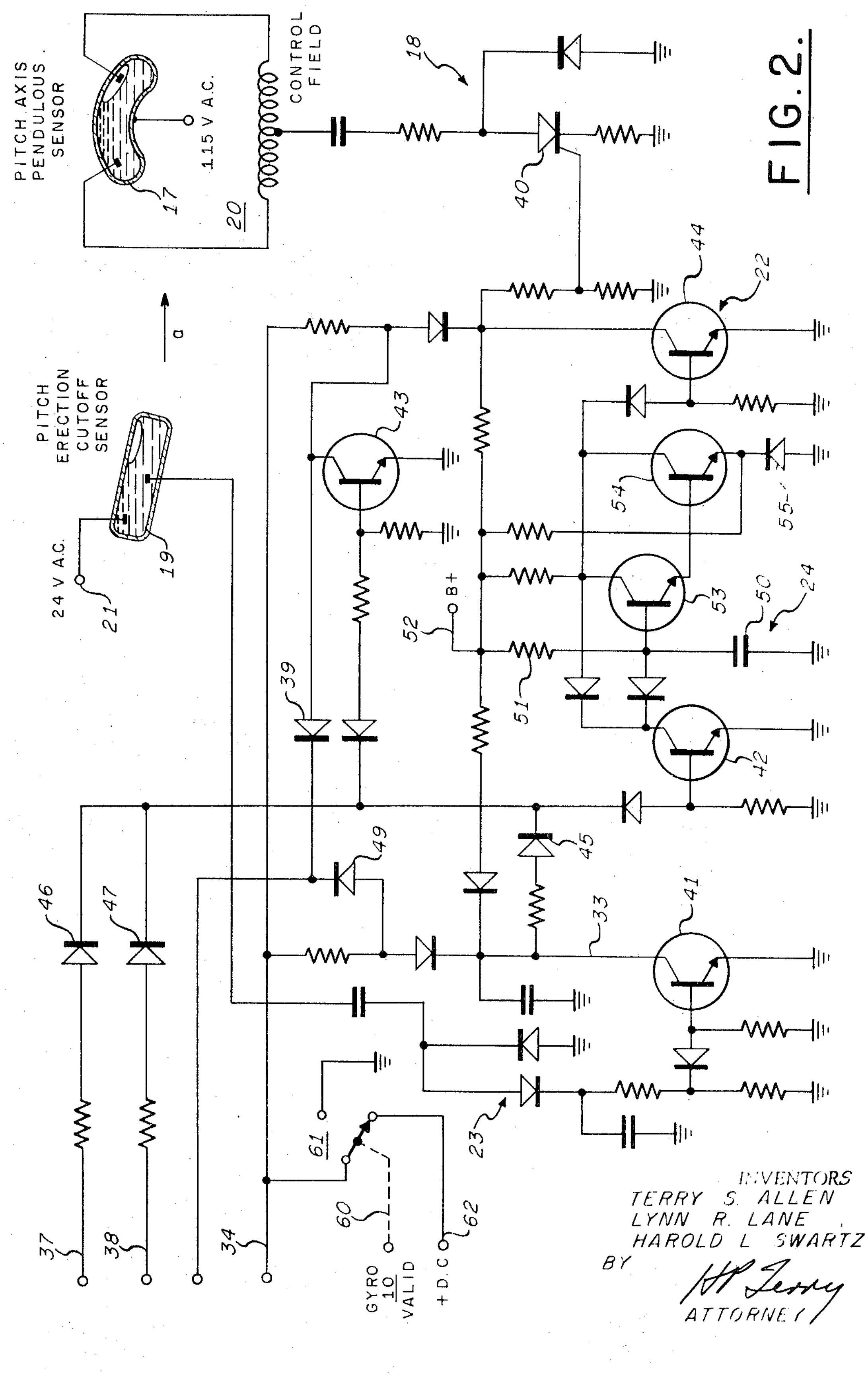
FIG. 2 is a detailed schematic of the erection control and cutoff circuits embodied in each of the gyroscopes of FIG. 1.

Referring now to FIG. 2, a detailed circuit schematic of the electronics for gyro 10 is illustrated and it will be understood that identical electronics are provided for gyros 11 and 12. The erection control liquid pendulous sensor 17, energized through alternating current supply, is connected to energize one or the other of the split control field windings of gyro torquer 20 upon tilt of the gyro off vertical. The control of current flow through the torquer control field is by means of a normally conducting SCR 40 through suitable resistance to ground. Thus, SCR 40 constitutes a part of erection torquer control 18 of FIG. 1, since if SCR 40 is turned off, erection control current will cease to flow through the torquer control field.

In FIGS. 2 it will be noted that only one of the erection control tilted liquid levels 19 is illustrated and for illustrative purposes it is shown being subjected to an acceleration in the direction of the arrow *a*. Under such acceleration, the electrolyte in cutoff sensor 19 conducts current from the 24-volt AC supply 21 through the diode demodulator 23 to turn on transistor 41. Conduction of 41 causes the voltage at leads 33 and 34 to drop to zero and if the erection cutoff sensors of the other gyros are also conducting, i.e., have called for erection cutoff, the voltage at leads 37 and 38 will likewise be at zero. Under such conditions, transistor 42 will turn off and transistor 43 will likewise turn off. However, if one or the other of gyros 11 and 12 have not called for erection cutoff, transistor 42 will remain on thereby keeping erection control of gyro 10 on. Only if all gyros call for cutoff will transistor 42 be shut off. Turning off transistor 42 will cause transistor 44 to turn on thereby turning off SCR 40 to cause it to cease conducting. As stated, such action prevents current flow in the torquer 20 control field and erection is cutoff. The AND-logic circuit means 30 of FIG. 1 comprises, in the illustrative circuit of FIG. 2, diodes 45, 46 and 47 connected in the common base circuit of transistor 42. Thus, transistor 42 will not turn off until the voltages on all of the leads 34, 37 and 38 drop to zero.

As stated above, erection cutoff is not allowed to continue for more than 3 minutes. The 3 minute timer circuit for each of the gyros is shown in detail in FIG. 2 and comprises a capacitor-resistor circuit generally indicated at 24. With transistor 42 turned off and with erection on gyros 11 and 12 likewise turned off, the charge on timer capacitor 50 begins to increase through resistor 51 from the B+supply 52. When the charge voltage reaches the predetermined trigger value of transistor 53, transistor 54 and diode 55, transistor 44 will be turned off thereby increasing the voltage at its collector and gating SCR 40 into conduction, restoring the ground path for the torquer 20 control field. Turning off transistor 44 increases the voltage at the collector of transistor 43 (which is still turned off), allowing the voltage on lead 34 to increase to thereby cause lead 37 or 38 to go high through corresponding circuits of gyros 11 and 12. If either of leads 37 or 38 had already been high, as by their timers triggering or a command for erection (19′, 19″ not conducting and switching transistor 41 off) transistor 43 would be turned on shorting its collector voltage to ground and causing the voltage on lead 34 to go low. Thus, a high voltage on the base of transistor 42 whether from the collector of 41 or from inputs 37 or 38 will turn on transistor 42 to thereby ensure erection on and a resetting of timer 24. It will be recognized that the logic of 1 is effectively incorporated in FIG. 2; NOR-logic 26 being comprised of diodes 46, 47 and transistor 43, AND-logic 25 comprising the collector circuits of transistors 42 and 43, and OR-logic 27 comprising diodes 39 and 49. After the 3 minute time interval, pitch erection voltage will continue to be applied indefinitely to all three gyros until pitch erection cutoff sensor 19 ceases to conduct on each of the three gyros. When this occurs, transistor 41 will turn off, transistor 42 will turn on removing the charge from timer capacitor 50 to reset the same. It will be noted that if any of the cutoff sensors of gyros 11 and 12 cease to conduct, transistor 42 will be turned on through the voltage on leads 37 and 38 going high.

The three gyros, 10, 11 and 12, are cross connected in such a manner that if for some reason any one of the gyros should fail, it is desirable that the erection cutoff modes of the remaining gyros will not be disabled. One means for accomplishing this fail-safe characteristic may be as follows. When a failure occurs, say in gyro 10, an invalid signal from its monitor output represented by the dotted line 60 in FIG. 2 operates relay 61 connected in the gyro electronics supply source 62. Operation of relay 61 therefore removed operating power so that gyro 10's contribution to the AND-logic is removed and gyros 11 and 12 continue to function as though gyro 10 was not present. Similarly, should a short to ground occur in any of the leads 34, 37 and 38 connecting the AND-logic and the OR-logic circuits, the effect will be the same. If all aircraft wires have ground faults, the cross connections between the AND and OR circuits will be essentially eliminated and the erection cutoff system for each of the gyros will operate in their normal fashion although on an individual basis.

It should be noted that the logic arrangement provides redundancy of the three minute timer. An operating timer in any one of the gyros 10, 11 and 12 will permit all of the other gyros to benefit from it. In other words, two timers can fail and the third timer will continue to control erection reset on all of the gyros. Thus, the requirement of a separate monitor of the gyro timer is not required.

Figure 3:
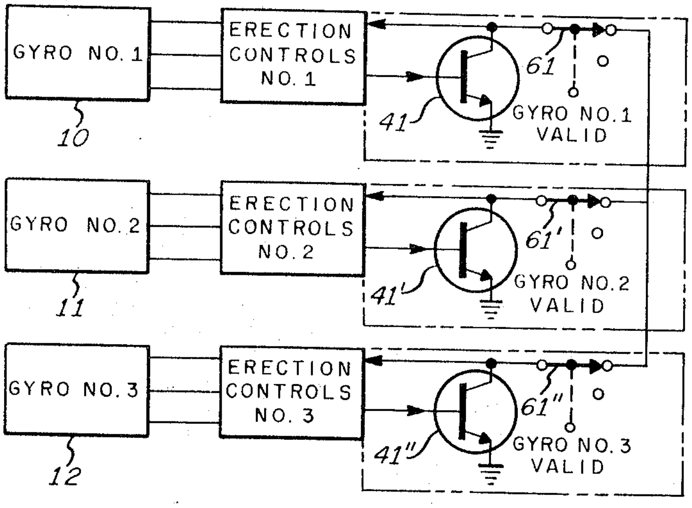
FIG. 3 is a schematic block diagram of a modification of the invention.

In FIGS. 1 and 2 AND-logic circuit means is employed to simultaneously cut the erection of all gyros depending upon receipt of an erection cutout signal from all gyros. In the modification of FIG. 3 an OR-logic circuit arrangement is employed whereby erection cutoff is likewise accomplished in a simultaneous manner depending upon the receipt of an erection cutoff signal from any one of the gyros. The OR logic function is provided by connecting the collector electrodes of transistor 41 of gyro 10 (corresponding to transistor 41 of FIG. 2) directly to the corresponding collectors of transistor 41′ and 41″ of gyros 11 and 12. When the erection cutoff sensor 17, 17′ or 17″ of any one of the gyros 10, 11 or 12 conducts, the base of corresponding transistor 41, 41′ or 41″ is turned on thereby driving all transistors 42, 42′ and 42″ off and simultaneOusly providing erection cutoff of all gyros. The logic cross connection between gyros is routed through monitor relays 61, 61′ and 61″ to provide similar fail-safe characteristics as the circuit of FIGS. 1 and 2.

Since many changes could be made in the above-described embodiments and many apparently widely different embodiments of the invention could be made without departing from the true scope and spirit thereof, it is intended that all matters contained in the above description or shown in the accompanying drawings shall be interpreted as illustrative and not in a limiting sense.

We claim:

1. An aircraft flight reference system comprising
   a. a plurality of gyroscopes each providing separate and substantially identical measures of aircraft attitude, each of said gyroscopes including means for normally slaving its spin axis to a common reference direction, said slaving means being responsive to accelerations of said aircraft tending to change said reference direction, and
   b. means interconnecting all of said gyroscopes for simultaneously interrupting the operation of the slaving control means of each of said gyroscopes when said accelerations exceed a predetermined value.

2. An aircraft flight reference system comprising
   a. a plurality of gyroscopes each providing separate and substantially identical identical of aircraft attitude, each of said gyroscopes including erection control means for normally slaving the gyroscope spin axis to a common predetermined reference direction, each of said gyroscopes also including erection cutoff sensor means responsive to a predetermined nominal threshold acceleration value for supplying an erection cutoff signal, and each of said gyroscopes further including cutoff actuation means for cutting out the said erection control means, and
   b. means responsive to at least one said cutoff signals for operating all of sad erection cutoff actuation means simultaneously whereby discrepancies between the indications provided by each of said gyroscopes due to cutoff sensor threshold tolerance of each of said gyroscopes are substantially eliminated.

3. The flight reference system as set forth in claim 2 wherein said last-mentioned means is responsive to all of said cutoff signals.

4. The flight reference system as set forth in claim 2 wherein said last-mentioned means is responsive tO any one of said cutoff signals.

5. The flight reference system as set forth in claim 2 wherein said last-mentioned means comprises AND logic circuit means having its output coupled with each of said erection cutoff actuation means, and means supplying all of aid cutoff signals to said AND logic circuit means.

6. The flight reference system as set forth in claim 2 wherein each of said gyroscopes further includes timing means adapted upon initiation to reinstate said erection control means after a predetermined time period, and further means responsive to the reinstatement of the erection control means of one of said gyroscopes for simultaneously reinstating the erection control means of all other of said gyroscopes.

* * * * *

UNITED STATES PATENT OFFICE
CERTIFICATE OF CORRECTION

Patent No. 3,640,137 Dated February 8, 1972

Inventor(s) Terry S. Allen, et al

It is certified that error appears in the above-identified patent and that said Letters Patent are hereby corrected as shown below:

Column 4, lines 5, 6, 8, 9, and 11, reference numerals "31" and "32" should read -- 30' -- and -- 30'' --; line 8, reference numerals "18-19" should read -- 19-19' --; line 9, reference numerals "35" and "36" should read --33' -- and -- 33'' --. In the Drawings, in Fig. 1 of sheet 1, the upper input to AND gate 30' should be connected to line 37 instead of line 38. The middle input to AND gate 30' should be connected to line 34 instead of line 37. The lower input to AND gate 30' should be connected to line 38 instead of line 34.

Signed and sealed this 7th day of November 1972.

(SEAL)
Attest:

EDWARD M.FLETCHER,JR.
Attesting Officer

ROBERT GOTTSCHALK
Commissioner of Patents